(12) United States Patent
Comanescu

(10) Patent No.: US 11,100,248 B2
(45) Date of Patent: Aug. 24, 2021

(54) APPARATUS, METHOD AND SYSTEM FOR GRANTING PRIORITY CERTIFICATES

(71) Applicant: Gelu Comanescu, Washington, DC (US)

(72) Inventor: Gelu Comanescu, Washington, DC (US)

(*) Notice: Subject to any disclaimer, the term of this patent is extended or adjusted under 35 U.S.C. 154(b) by 4 days.

(21) Appl. No.: 15/123,678

(22) PCT Filed: Mar. 6, 2015

(86) PCT No.: PCT/US2015/019316
§ 371 (c)(1),
(2) Date: Sep. 5, 2016

(87) PCT Pub. No.: WO2015/134950
PCT Pub. Date: Sep. 11, 2015

(65) Prior Publication Data
US 2017/0017800 A1    Jan. 19, 2017

Related U.S. Application Data

(63) Continuation-in-part of application No. 14/615,341, filed on Feb. 5, 2015.
(Continued)

(51) Int. Cl.
*H04L 9/30* (2006.01)
*H04L 29/06* (2006.01)
(Continued)

(52) U.S. Cl.
CPC ......... *G06F 21/6245* (2013.01); *G06Q 10/10* (2013.01); *G06Q 50/184* (2013.01)

(58) Field of Classification Search
CPC ... G06F 21/6245; G06Q 10/10; G06Q 50/184
See application file for complete search history.

(56) References Cited

U.S. PATENT DOCUMENTS

| | | | | |
|---|---|---|---|---|
| 6,298,327 | B1* | 10/2001 | Hunter | G06F 17/243 705/1.1 |
| 2011/0302210 | A1* | 12/2011 | Comanescu | G06Q 50/18 707/784 |
| 2012/0016859 | A1* | 1/2012 | Sears | G06F 16/382 707/706 |

OTHER PUBLICATIONS

Abramowicz, Michael B. and Duffy, John Fitzgerald, Intellectual Property for Market Experimentation. New York University Law Review, Forthcoming; GWU Legal Studies Research Paper No. 396; GWU Law School Public Law Research Paper No. 396. Available at SSRN: https://ssrn.com/abstract=1090887.
(Continued)

*Primary Examiner* — Wasika Nipa

(57) ABSTRACT

A system for awarding priority-certificates and for providing personal-priority-accounts is disclosed. The system may include an apparatus for receiving priority-certificate applications including priority-claims with respect to one or more abstract ideas, discoveries, or other subject matter not covered by any form of intellectual property. The system may include a first-computer-system, a first-storage-unit connected with the first-computer-system, and a second-storage-unit connected with the first-computer-system. The system may further include a personal-priority-account apparatus configured to enable a user to save priority-documents on an account administrated by an independent party keeping said documents in trust for the user. The system may further include an apparatus configured to associate priority-documents to the application. The application may be examined by an examiner to find whether the priority-claims are valid. The system may include a priority-certificate creating apparatus configured to create and issue priority-certificates in the name of the claimants.

9 Claims, 15 Drawing Sheets

Related U.S. Application Data

(60) Provisional application No. 61/949,379, filed on Mar. 7, 2014, provisional application No. 61/950,150, filed on Mar. 9, 2014.

(51) Int. Cl.
*G06F 21/62* (2013.01)
*G06Q 50/18* (2012.01)
*G06Q 10/10* (2012.01)

(56) References Cited

OTHER PUBLICATIONS

Abramowicz, Michael B. and Duffy, John Fitzgerald, Ending the Patenting Monopoly (2009). University of Pennsylvania Law Review, vol. 157, No. 6, 2009; GWU Law School Public Law Research Paper No. 2013-99; GWU Legal Studies Research Paper No. 2013-99. Available at SSRN: https://ssrn.com/abstract=2286804.

Kieff, F. Scott, The Case for Registering Patents and the Law and Economics of Present Patent-Obtaining Rules (Apr. 1, 2003). Harvard Law and Economics Discussion Paper No. 415; Washington U School of Law Working Paper No. 03-04-03. Available at SSRN: https://ssrn.com/abstract=392202 or http://dx.doi.org/10.2139/ssrn.392202.

Non Final Office Action dated Jul. 13, 2018 for U.S. Appl. No. 14/615,341 (Publication No. US 2015/0221055 A1), filed Feb. 5, 2015 and titled (currently abandoned).

Abramowicz, Michael B., Perfecting Patent Prizes (2001). George Mason Law & Economics Research Paper No. 01-29. Available at SSRN: https://ssrn.com/abstract=292079 or http://dx.doi.org/10.2139/ssrn.292079.

\* cited by examiner

Fig. 4b

Published Formal Priority-Claims (No: 15/123,456)

Title: Discovery of a new gallium-nitride crystalline structure.

Claimants: John Smith & Mark Harris (of Electronics Corp.)

Scientific Fields: Physics (D65)
Sub-fields: Solid State Physics (H29), Crystalline Structure (E43)

| Claims | Claimants | Priority-Date |
|--------|-----------|---------------|
| 1 - 5  | Smith     | 01-12-2014    |
| 6 - 8  | Smith & Harris | 02-15-2014 |
| 9 - 10 | Harris    | 05-25-2014    |

A. Detailed description of the priority-claims (download files):

*Abstract* / *Specification* / *Claims* / *Drawings (hyperlinks)*

B. Supporting Documents :

*Document-1* / *Document-2* ... *see complete list (hyperlinks)*

*Priority-Document-1*; *Priority-Document-2 (hyperlinks)*

C. Third-party submissions & comments:

View documents / comments submitted by third parties:

▲ *Comment-1* (08-29-2016)
▲ *Comment-2* (11-14-2016)
▲ *Prior-art document* (11-14-2016)    *(hyperlinks)*
▲ *Third party declaration* (11-14-2016)
▲ *Comment-3* (04-20-2017)
   ... *see complete list*

Submit documents and comments relevant to the validity of the claims in this application (via Submission Interface):

[Submit Comments & Documents]

Upload your comments & documents:

[_____]  [Browse...]  [Upload]

Fig. 7

Application number: 11/123,456 — 700

Title: Discovery of a new gallium-nitride crystalline structure.

Claimants: John Smith & Mark Harris (of Electronics Corp.)

Scientific Fields: Physics (D65)
Sub-fields: Solid State Physics (H29), Crystalline Structure (E43)

| Claims | Claimants | Priority-Date |
|---|---|---|
| 1 - 5 | Smith | 01-12-2014 |
| 6 - 8 | Smith & Harris | 02-15-2014 |
| 9 - 10 | Harris | 05-25-2014 |

— 701

Application status: LAID-OPEN (UNEXAMINED) — 702

A. Application Files:
*Abstract* / *Specification* / *Claims* / *Drawings* (hyperlinks)

B. Examination / Prosecution History: — 703
*Document-1* / *Document-2* … *see complete list* (hyperlinks)

C. Third-party submissions & comments: — 705

View documents / comments submitted by third parties:

▲ *Comment-1 (08-29-2016)*
▲ *Comment-2 (11-14-2016)* (hyperlinks)
▲ *Prior-art document (11-14-2016)*
▲ *Third party declaration (11-14-2016)*
▲ *Comment-3 (04-20-2017)*
    … *see complete list*

Submit documents and comments relevant to the validity of the claims in this application (via Submission Interface):

[ Submit Comments & Documents ]

Upload your comments & documents:

[          ]  [ Browse… ]  [ Upload ]

Fig. 9a

Priority Certificate (In the name of Granting Institution)

Title: Discovery of a new gallium-nitride crystalline structure.

Claimants: John C. Smith and Mark Harris (of Electronics Corp.)

Priority-Certificate number: 440,237
Application number: 11/123,456
Issue date: June 14, 2016

| Claims | Claimants | Priority-Date |
|--------|-----------|---------------|
| 1 - 5  | Smith     | 01-12-2014    |
| 6 - 8  | Smith and Harris | 02-15-2014 |
| 9 - 10 | Harris    | 05-25-2014    |

Scientific Fields: Physics >> Solid State Physics >> Crystalline Structure

"The grantor (e.g. University) attests that the priority-claims in the above application filed by John C. Smith & Mark Harris have been examined and, to the best of grantor's knowledge, the claims have been found to be true and valid. Thereby, a Priority-Certificate has been granted today June 14, 2016 attesting that John C. Smith & Mark Harris are the first to discover the subject matter claimed in the above application"

Signed by the Grantor:

Priority-Certificate No.: 440,237

Title: Discovery of a new gallium-nitride crystalline structure.

Claimants: John C. Smith and Mark Harris
Application number: 11/123,456
Issue date: June 14, 2016

| Claims | Claimants | Priority-Date |
|---|---|---|
| 1 - 5 | Smith | 01-12-2014 |
| 6 - 8 | Smith and Harris | 02-15-2014 |
| 9 - 10 | Harris | 05-25-2014 |

Scientific / art field classification:
Physics >> Solid State >> Crystalline Structure

Application status: ISSUED
Certificate status: VALID / WITHDRAWN (see reasons)

SCORES (1 to 10):
Predicted value to society: 6
Creativity: 7
Theoretical importance: 9

RANK (regarding "predicted value to society"):
- 6 - in the "Crystallography" sub-field for year 2017.
- 45 - in the "Materials-Science" field for year 2017.

A. Detailed Description & Examination History:

*Abstract* / *Specification* / *Claims* / *Drawings* (hyperlinks)
*Document-1* / *Document-2* ... *see complete list* (hyperlinks)

C. Third-party submissions & comments:

View documents / comments submitted by third parties:

*Comment-1* (08-29-2016)
*Comment-2* (11-14-2016)
*Priori-art document* (11-14-2016)       (hyperlinks)
*Third party declaration* (11-14-2016)
*Comment-3* (04-20-2017)
... *see complete list*
▲ ▲ ▲ ▲ ▲

Submit documents and comments relevant to the validity of the claims in this application (via Submission interface):

[ Submit Comments & Documents ]

Upload your comments & documents:

[                    ] [ Browse... ] [ Upload ]

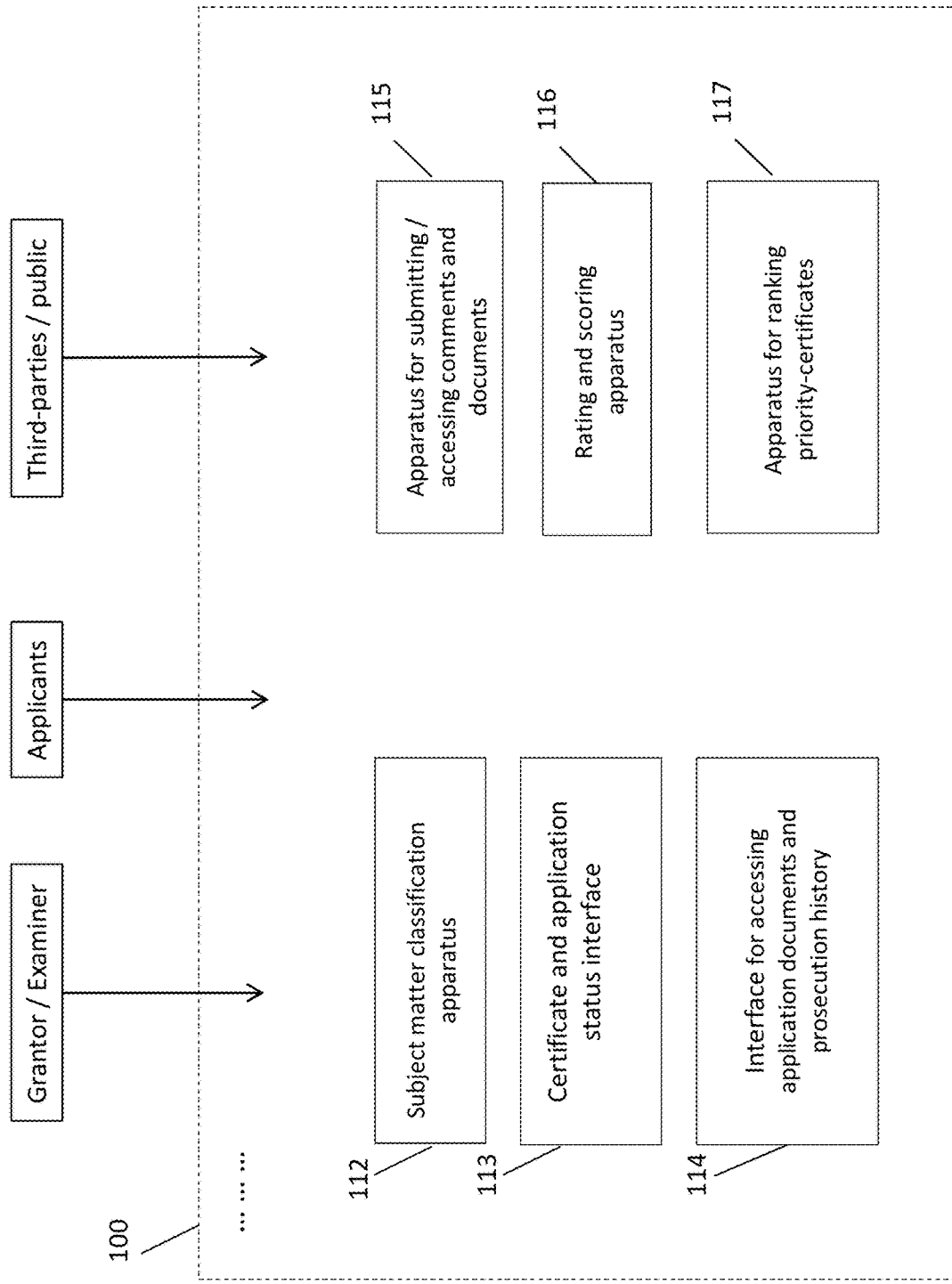

Scientific / Innovation field: Physics >> Solid State Physics >> Crystalline Structure Enter period of interest (years): [ 2013-2015 ] —— 154

Priority-certificates issued in the "crystalline-structure" class, during years 2013-2015:
*[[Applications filed in the "crystalline-structure" class – time period 2013-2015]]*
*[[Published priority-claims in the "crystalline-structure" class – time period 2013-2015]]*

1. *Discovery of a new gallium-nitride crystalline structure,* by John V. Smith (Jan. 4, 2013).
2. *First proponent of a method to make double wall carbon nanotubes,* by Kathy Cooley (Feb. 23, 2013).
3. *Discovery of the bond structure at the GaSb/InAs hetero-structures,* by Alice Yu (March 12, 2014).
4. *First measurement of the bond strength at the interface GaAs/AlAs,* by Vera Coors (April 2, 2014).
5. *Discovery of a new InAs crystalline structure,* by John Taney (May 4, 2014).
6. *First proponent of a method to make double layer graphite,* by Karen Smith (June 23, 2014).
7. *Discovery of the bond structure at the CdSe hetero-structures,* by Ally Wu (July 12, 2014).
8. *First measurement of the bond strength in SiGe hetero-structures,* by Anna Sun (Jan. 2, 2015).
9. *Discovery of a new high pressure crystalline structure in ice,* by Chuck Smith (Feb. 23, 2015).
10. *First proponent of a way to measure total crystal energy,* by David Smith (May. 3, 2015).
11. *Discovery of a new type of bond in ZnO single crystals,* by Mary Allen (May 12, 2015).
12. *First measurement of the dissociation energy of nanoparticles,* by Peter Kroos (June 21, 2015).

*(hyperlinks to publication webpage corresponding to each priority-certificate)*

Fig. 13

Priority-Certificates Rankings

Chose Field: Engineering >> Materials-Science        Chose Year: 2015

Top 100 ideas & discoveries in "Materials-Science" for year 2015:

1. Discovery of a new gallium-nitride crystalline structure, by John V. Smith (Univ. of Maryland).
2. First proponent of a method to make double wall carbon nanotubes, by Kathy Cooley (individual).
3. Discovery of the bond structure at the GaSb/InAs hetero-structures, by Alice Yu (Univ. of Maryland).
4. First measurement of the bond strength at the interface GaAs/AlAs, by Vera Coors (Synergy Inc.).
5. Discovery of a new InAs crystalline structure, by John Taney (Laurel Micro-Devices Inc.).
6. First proponent of a method to make double layer graphite, by Karen Smith (Univ. of Maryland).
7. Discovery of the bond structure at the CdSe hetero-structures, by Ally Wu (Synergy Inc.).
8. First measurement of the bond strength in SiGe hetero-structures, by Anna Sun (Chesapeake Materials Inc.).
9. Discovery of a new high pressure crystalline structure in ice, by Chuck Smith (Johns Hopkins Univ.).
10. First proponent of a way to measure total crystal energy, by David Smith (Green Energy Inc.).
11. Discovery of a new type of bond in ZnO single crystals, by Mary Allen (Synergy Inc.).
12. First measurement of the dissociation energy of nanoparticles, by Peter Kroos (Univ. of Maryland).

... see more

APPARATUS, METHOD AND SYSTEM FOR GRANTING PRIORITY CERTIFICATES

CROSS REFERENCE TO RELATED APPLICATION

This application claims priority from and the benefit of the U.S. Provisional Patent Applications No. 61/949,379 filed Mar. 7, 2014; Provisional Patent applications No. 61/950,150 filed Mar. 9, 2014, non-provisional patent application Ser. No. 14/615,341 filed Feb. 5, 2015 by the same inventor as the inventor of this application. The above applications are hereby incorporated by reference for all purposes as if fully set forth herein.

TECHNICAL FIELD

This application relates to the field of computers and networks systems.

BACKGROUND ART

An invention patent may be regarded as an official document certifying that the inventor is the first person to invent (or at least to file an application for patent) the inventions recited by the claims. For example, an inventor of an invention patent can use the physical embodiment of the invention patent (e.g. the hard copy or a digital copy of the issued patent) as proof that he is the first to invent the subject matter recited by the claims recited in the patent.

However, invention patents cover only specific categories of subject matter: process; machine; manufacture and compositions of matter. Invention patents specifically do not cover abstract ideas and scientific discoveries as is well known by the skilled artisans in the field of Intellectual Property. Generally, scientific discoveries, abstract ideas, thesis, and theories are not protectable by other forms intellectual property.

In many circumstances (e.g. academia and government research laboratories) it is important to ascertain the actual proponent of an abstract idea, the first person who discovered a certain phenomenon, the creator of a scientific theory, or the party who first discovered a certain composition of matter. Further, innovators, scientists and creators that have achieved a certain priority feat would like to secure proof that they have achieved such a feat. Such proof may bring recognition of the scientific community and prestige. For example, a person who is the first proponent of an abstract idea, the first discoverer of a certain phenomenon, the creator of a scientific theory, or the first discoverer of a certain composition of matter would like to have a uniform and recognizable means of proving that he achieved such a priority feat.

Thus, it would be useful if innovators would have available a system and an apparatus providing them with an uniform and recognizable means of showing that they achieved feats such as: a person is the first proponent of an abstract idea, the first creator of a scientific theory, the proponent of a thesis, the first to discover a phenomenon/composition of matter. Further, it would be useful if innovators would have available a system and an apparatus enabling them to secure priority for their ideas and discoveries within short time from conceiving of said ideas or from making said discoveries. Thus, there is a need for systems and apparatuses helping innovators to secure proof that they have achieved priority with respect to certain subject matter and for systems and apparatuses helping innovators to secure priority for their ideas and discoveries. However, achieving the above purposes and/or benefits is not a necessary feature to each of the exemplary embodiments and claims may recite subject matter that does not achieve each of the purposes.

DISCLOSURE OF INVENTION

The following detailed description is provided to gain a comprehensive understanding of the methods, apparatuses and/or systems described herein. Various changes, modifications, and equivalents of the systems, apparatuses and/or methods described herein will suggest themselves to those of ordinary skill in the art. Descriptions of well-known functions and structures are omitted to enhance clarity and conciseness.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. Furthermore, the use of the terms a, an, etc. does not denote a limitation of quantity, but rather denotes the presence of at least one of the referenced item.

The use of the terms "first", "second", and the like does not imply any particular order, but they are included to identify individual elements. Moreover, the use of the terms first, second, etc. does not denote any order or importance, but rather the terms first, second, etc. are used to distinguish one element from another.

It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Although some features may be described with respect to individual exemplary embodiments, aspects need not be limited thereto such that features from one or more exemplary embodiments may be combinable with other features from one or more exemplary embodiments.

The last 30 years have seen the development of means to store information on various data storage media (hard disks, solid-state memory; compact disks etc.) and the development of ways people can store information on such storage media remotely via on-line internet services from their homes on storage-media far away from their residence. The exemplary embodiments described herein refer to apparatuses and methods making use of digital storage technology and remote access to data.

The exemplary embodiments may disclose system and apparatuses providing parties (e.g. scientists, engineers, creators, problem solvers, innovators, thinkers etc.) with a computer based apparatus and system helping such parties to prove that they have achieved a certain feat/achievement. For example, the methods and systems disclosed herein may help a person to show and prove that he or she is: the first to discover a phenomenon; the first to discover a naturally occurring composition of matter; the first proponent of an abstract idea or a thesis; the first proponent of an explanation regarding an occurrence; the first to perform a specific measurement or observation; the first proponent of a solution to a problem; the first to perform a specific calculation; the first proponent of a law or legal argument; the first proponent of a business or accounting strategy; the first proponent of a strategy for solving a crisis (e.g. a solution to an international crisis, a way to improve healthcare law, an amendment to the environmental law, a way to decrease homelessness); the first proponent of a mathematical formula, algorithm or proof; the first to propose a strategy for solving a differential system of equations; the first to perform a certain surgical procedure; the first to successfully apply/perform a certain medical treatment procedure; the first to propose a movie plot; the first to propose or perform a choreographic sequence of movements; the first to conceive an idea for a painting or a sculpture; etc.

Hereinafter the terms user, client and applicant may be used interchangeably and may refer to a same party. Hereinafter the terms administrator and grantor may be used interchangeably and may refer to a same party.

An independent party (hereinafter an administrator) may implement and provide an on-line internet based service helping such parties/clients to prove that they have achieved a feat/achievement as the one above. The on-line internet based service may include one or more of the computer based apparatuses and systems disclosed herein below.

FIG. 1 is a view showing a system 100 for awarding priority-certificates according to an exemplary embodiment of the present invention. The system for awarding priority-certificates may include a personal-priority-account apparatus 102, a priority-certificate application receiving apparatus 107, an apparatus for receiving priority-documents 108, an apparatus for determining prior-art 109, and an apparatus for creating priority-certificates 110.

The personal-priority-account apparatus 102 may include an apparatus for creating and accessing a personal-priority-account 103, an apparatus for saving priority-documents on the personal-priority-account 104, and an apparatus for creating a time-stamp 105. The above system and apparatuses may be implemented via one or more of: computers; non-transitory computer readable media; software, programming modules and code stored on the computers; networks; and webpages.

FIG. 2 shows an exemplary embodiment of an apparatus for creating and accessing a personal-priority-account 102. The apparatus for creating/accessing a personal-priority-account 102 may include a client system 200, an administrator system 210, and an internet/network connection 220 between the client system 200 and the administrator system 210. The client system 200 may include a first data storage media 201, a first computer 202, a first processor 203, a first display 204, a first input device 205, one or more first controls 206. The administrator system may include: a second data storage media 211, a second computer 212, a second processor 213, a second display 214, a second input device 215, one or more second controls 216. The client system 200 may be controlled or under the custody of the client whereas the administrator system 210 may be controlled or under the custody of the administrator.

A client may use the first input device 205 to communicate with the first computer 202. The first computer may be configured to display on the first display 204 an interface 301 as the one shown in FIG. 3. The interface 301 may be implemented via one or more webpages of a website. The apparatus 103 for creating and accessing a personal-priority-account is configured to enable the user to access the controls 206 and control/perform one or more operations associated with said controls. The controls 206 may have associated one or more buttons, text boxes, and other interface-controls on the interface 301 such as the buttons and text boxes 302 and 303 in FIG. 3. The controls 206 may be operated via said associated buttons, text-boxes and interface-controls on the interface 301. The controls 206 and 216 are analogous with the controls, buttons and levers enabling an operator to control an electro-mechanical machine (e.g. a crane) and may be implemented via a plurality of interconnected electronic components (e.g. electronic switches, transistors, diodes, memory cells, etc.) and a plurality of programming and code modules.

A client, such as a scientist or innovator who conceived an idea or made a discovery, may use the apparatus for creating and accessing a personal priority-account 103 of the personal-priority-account apparatus 102 to create/open a personal-priority-account on the administrator system 210. The client may use the interface-controls (e.g. such as 302 and 303) on the interface 301 to access the controls 206 thereby sending a request to the administrator system 210 for opening a personal-priority-account. For example, client may click the button 302 on a webpage interface, such as the one shown in FIG. 3, and follow the instructions for opening an account (e.g. enter text via text-boxes). In response to the request for opening a personal-priority-account, the administrator system may assign to the client a personal-priority-account including a personal memory-section 218 (on the data storage media 211) allocated to client's personal-priority-account. The above requests and communications are sent/performed via the processors 203 and 213 and the internet/network 220.

The apparatus 104 for saving priority documents on the personal priority-account may enable the client to save, store and access priority documents and files on his personal memory-section 218 of the personal-priority-account. The priority-documents and files may come in the form of text files, drawings files, picture files, video files, audio files, data files, etc. The client may be enabled to access his personal-priority-account (and associated memory-section 218) via a login and password interface-controls 303 displayed on the interface 301. The interface 301 may further include/display one or more instructions 304 regarding how to use the personal-priority-account. The interface 301 is preferably implemented via one or more webpages whereas the controls 302-304 are implemented via buttons, text boxes, hyperlinks, and other controls/components displayed on webpages. The client may login on his account by entering a username and a password. The communications between the client, client-system 210, and administrator-system 220, may be performed via the processors 203 and 213 and the internet/network connections 220.

FIG. 4 shows an exemplary embodiment of a computer interface 400 that may be displayed on the first display 201 after the client has logged in his personal-priority-account thereby the client accessing the controls and functions of the apparatus 104 for storing and accessing documents on the personal-priority-account. The computer interface 400 may include one or more interface control blocks (e.g. buttons, text-boxes, hyperlinks, and combinations therein) such as: control block 401 configured to enable the user to create and save text describing his ideas and discoveries (or his achievements—such as performance of a surgical procedure); controls 402 configured to enable the user to upload documents from first storage media 201 to the memory-section 218 (located on the administrator's system 210) allocated to his personal-priority-account; one or more controls 403 configured to display user records including the documents/records created or upload on the personal-priority-account and the corresponding time-stamps (i.e. creation or upload date and time); one or more controls for creating and displaying a user information document and/or declarations 404; one or more controls for displaying a name or an identification of the user 405; a control for logging off the personal-priority-account 406; one or more instructions regarding how to use the personal-priority-account 407; and one control 408 enabling an user to access a computer interface (such as the one in FIG. 6) to the apparatus 107 for receiving/filing applications for priority-certificates.

The above mentioned computer interface blocks and interface-controls may be associated with the controls 206 of the computer 202 and controls 216 on the computer 212 as explained hereinafter. For example, with reference to the control block 402, upon receiving a command via the user input 205 (e.g. mouse-clicking the button "browse" on the control block 402) one or more of the controls 206 may be activated to access the data storage media 201 and display on the interface a window showing a plurality of files and folders. The user may select via the interface control a specific file he wants to be upload in the memory-section 218 associated with his personal-priority-account. After that, the user may click the button "upload" (of the control block 402) which may activate one or more controls 206 configured to send a digital copy of the selected file to the administrator system 210 and cause the storing of the digital copy in the memory space 218 allocated to user's personal-priority-account. Thus, the controls of the control block 402 enable the user to upload one or more documents/files from the data storage media 201 (which may be a storage media on user's personal computer) onto the memory-section 218 (located on the data storage media 211 which is under the control of an administrator) associated with user's personal-priority-account.

In a similar manner as in the above paragraph, the controls 206, 216 and the interface-controls of control block 401 may enable the user to create documents (e.g. via the text box in control block 401) and save the documents onto the memory-section 218 associated with user's personal-priority-account.

The apparatus for creating a time-stamp 105 is configured to create a time-stamp indicating the time when each document stored on the personal-priority-account was upload or created. Whenever a file is uploaded/stored on the memory-section 218, the apparatus 105, via one or more of the controls 206 and 216, may create a digital time-stamp associated with the uploaded/stored file. The apparatus 105 may store the time-stamps on the memory storage 218 as associated to the corresponding file. The digital time-stamp may include the time and date when the document was uploaded/stored.

The controls 206 and 216 may further be configured to form a list of the documents/files stored on the memory storage 218 and their corresponding time-stamps. The controls 206 and 216 may be further configured to display the list on the computer interface 400 as shown by the table 403 in FIG. 4. Documents on the list 403 may be associated interface-controls (e.g. buttons or hyperlinks) such that a user may operate these interface-controls (e.g. by mouse clicking).

The controls 206, 216 and the interface-controls of control block 403 may enable the user to cause the computer 212 to make digital copies of documents stored on memory-section 218 and send such copies to user's computer 202 where the documents are further displayed on the display 204. For example, the mouse clicking by the user of a hyperlink associated with file-1, may create a copy of the file-1 and send the copy, over the internet connection 220, to user's computer 202. This way, a user is enabled to view and download the documents stored on his personal-priority-account and the time-stamps corresponding to said documents.

The interface 400 may include one or more interface-controls 404 for creating and displaying a user information document and/or declarations. The user may be enabled to associate his name and other personal information (e.g. address, associations, etc.) to the personal-priority-account and the memory-section 218. Upon creating/opening the personal-priority-account a user may be prompted to enter, via the first input device 205, his personal information in one or more text boxes displayed on the display 204. The controls 206 may create a user-information digital file/document and cause the file to be sent to the administrator system 210. The controls 216 of the administrator system 210 may cause the user-information digital file to be stored in the memory-section 218 of user's personal-priority-account. The controls 216 may extract a name from the user-information digital file and cause said name to be displayed on the interface 405. The controls 216 may create a button or a hyperlink on the interface 400 enabling a user to view the user-information digital file.

The interface 400 may further include a logoff button or hyperlink 406 enabling an user to logoff his personal-priority-account.

The above mentioned interface-controls 401-408 and the associated controls 206 and 216 may be implemented via hardware components interfaced with software/command blocks. The above mentioned interface-controls 401-407 and the associated controls 206 and 216 are well known by the persons of ordinary skill in the art of computer hardware, software and network engineering. The computer interface 400 may be implemented via one or more webpages.

The apparatuses 103-105 may include one or more controls of the controls 206 and 216, computers 202 and 212, storage media 201 and 211, processors, and programming instructions stored on the storage media 201 and 211.

The client may use the personal-priority-account 102 as described hereinafter. Upon making a discovery or conceiving an idea the client may access an interface (e.g. via a webpage associated with the interface) of the system 101 and open a personal-priority-account. After opening the personal-priority-account, the client may access his account and use the computer interface 400 to save (e.g. by uploading documents and files, creating text, etc.) on his account documents describing his ideas and discoveries and the date and time these documents have been created (e.g. time-stamp of each document). Thus, the client may save priority-documents describing his/her ideas and discoveries within short time (e.g. 20 minutes) after conceiving of these ideas and discoveries. The administrator may keep the documents, and the corresponding upload date and time for each document on a client's personal-priority-account, securely and/or confidentially on client's behalf. The client may return at later times (e.g. one day, one month, one year, essentially any time etc.) to his account and upload more documents/files (e.g. documents describing ideas/discoveries/achievements, personal information documents, documents relevant to said discoveries/ideas/achievements). The client may view and download the documents saved on his personal-priority-account at essentially any time by accessing (logging in) his account.

The administrator may be an independent party legally bound to keep the documents on client's personal-priority-account (e.g. saved on the memory-section 218) securely and confidentially on client's behalf. The administrator may have control (e.g. ownership, custody) over the data storage-media 211 storing the documents on client's personal-priority-account. The administrator may employ protecting means ensuring that only the client can access (e.g. via login and password) the files/documents stored on the memory-section 218. The client may have substantially exclusive access to his account and the documents stored on his account. Administrator may handle the files containing the documents stored by the client without looking at the content of the documents. For example, the files may be encrypted such that only the client can view the content of the documents. The client may be enabled to give permission to the administrator or other third parties to access one or more documents stored in his personal-priority-account.

The administrator may testify/certify that client has created the uploaded documents on the upload date and time. For example, the administrator may provide to the user/client (or third parties indicated by the client) written certification that a certain document has been uploaded/created on the personal-priority-account system on the date shown by the time-stamp. The documents on the priority-account may be considered/used as priority-documents or as provisional applications for priority-certificates (similar to the provisional applications for patents) in applications for priority-certificates. The administrator may charge a fee such as to offset the costs of implementing and maintaining the system. The administrator may charge a yearly/monthly account fee such that the user does not have the burden of paying a fee every time he stores a priority-document/file on his account.

Further, the administrator or another party may implement and maintain a publication website where clients/users may publish (e.g. via webpages) ideas, discoveries and achievements such as the ideas/discoveries/achievements described in the documents stored in personal-priority-account or other ideas and discoveries. The published documents may be accompanied by written certification (received from the administrator) that the documents have been created/saved on the personal-priority-account on the date and time shown by the time-stamps. This way the user (i.e. creator of the document) may publically assert that he has conceived the ideas disclosed in the documents at least as early as the time shown by the time-stamp.

In another exemplary embodiment a party (e.g. administrator of the personal-priority-system) may implement and maintain a publication website where clients/users/claimants may publish (e.g. via webpages) priority-claims with respect to ideas and discoveries (e.g. the ideas/discoveries/achievements described in the documents stored in personal-priority-account, other ideas/discoveries/achievements). The published priority-claims may satisfy formal requirements (e.g. may be formal priority-claims similar to the formal claims concluding invention patents). For example, a user may publish a document including a formal priority-claim that the user is the first to propose a certain strategy for solving a political crisis, the first to propose a strategy for solving a specific differential equation, the first to discover a certain phenomenon, the first proponent of an abstract idea or theory, the first proponent of a solution to a problem, the first to provide an explanation, the first proponent of a choreographic sequence, the first to perform a surgical/treatment procedure, etc.

A claimant may associate/submit, with his priority-claims, supporting evidence such as: declarations, experimental data, descriptions, priority-documents (and associated time-stamps) on a personal-priority-account, etc. The priority-documents may be accompanied by certification from an administrator of a personal-priority-account system that the supporting priority-documents have been indeed created/saved on the personal-priority-account of the claimant at the times shown by the time-stamps. This way the user/claimant (i.e. creator of the document) may publically assert that he has conceived the ideas/discoveries/achievements recited by the published priority-claims at least as early as the time shown by the time-stamp. The claimants may convert such priority-claims into applications for priority-certificates such as the ones described hereinafter.

A webpage associated with one or more published priority-claims may look substantially like the interface 450 of FIG. 4b. The webpage may include a title, a classification of the priority-claim by the scientific field it pertains, hyperlinks to the detailed descriptions of the claims and to supporting documentation, and an interface for receiving third-party comments and submissions. The webpage may identify one or more claimants (e.g. by name), may specify that the claimants prefer to remain anonymous and identify them as such (e.g. "anonymous-claimant-1", "anonymous-claimant-2," etc.), or may provide only partial information about the claimants. The interface 450 may be implemented and function substantially in the same way as the interface 700 shown in FIG. 7 and as explained in this disclosure with respect to said interface 700.

FIG. 5 shows an exemplary embodiment of a priority-certificate application receiving apparatus/system 107. The priority-certificate application receiving apparatus 107 may include a user system 500 (substantially identical with the user system 200 in FIG. 2); an administrator system 510; and an internet/network connection 520 (substantially identical with 220 in FIG. 2). The administrator system 510 may include components 511 to 518 which are essentially identical with the corresponding components in the administrator system 210 shown in FIG. 2. The administrator system 510 may further include a third data storage media 525. The client system 500 may be controlled or under the custody of the client whereas the administrator system 510 may be controlled or under the custody of the administrator.

FIG. 6 shows an exemplary embodiment of a computer interface 600 configured to enable users to file priority-certificate applications with an administrator or grantor of priority-certificates.

The interface 600 may be displayed on the first display 501 and may be implemented via a webpage of a website. The website may be maintained by the administrator and may be dedicated to enabling users to file applications for priority-certificates with the administrator. The computer interface 600 may include one or more interface control blocks (e.g. buttons, text-boxes, hyperlinks, and combinations therein) such as: an application upload control block 601 and a priority-data control block 602. The application upload control block 601 may be configured to enable a user/applicant to file an application for priority-certificate. A user may be enabled to create and store on user's data storage 501 an application file/document. The user may be enabled to create a digital copy of the application file and sent the copy to the administrator system 510 via the internet/network 520. The administrator system may allocate for user's application a data storage section 526 on the third storage media 525. The administrator system 510 may store the digital application file in the data storage section 526.

The above operations of creating copies of the application files, transmitting the application files via the internet/network 520, allocating a memory section 526 to the application files, and storing the application files on the memory section 526 are performed in a similar manner as the operations described with respect to FIGS. 2-4 and involving the controls 206 and 216 and the other components of the user and administrator systems 200 and 210. The application upload control block 601 may be configured to enable a user to send the application files to the administrator via, for example, buttons "browse" and "upload" and a box for selecting the file from user's data storage media 501. The operation of the interface buttons, controls, text-boxes and hyperlinks are well known by the persons of ordinary skill in the art of computer hardware, software and network engineering.

The application for priority-certificates may include a specification describing abstract ideas conceived by one or more claimants. The application for priority-certificates may include a specification describing one or more discoveries made by one or more claimants. The application for priority-certificates may include a specification describing one or more intellectual achievements (e.g. performed a certain surgery, performed a calculation) made by one or more claimants. The users/clients/applicants may be the claimants in the application filed by such users. The specification may be accompanied by drawings. The specification may include one or more formal priority-claims wherein each such priority-claim recites a specific and particular abstract idea conceived by a claimant. The specification may include one or more formal priority-claims wherein each such priority-claim recites a specific and particular discovery made by a claimant. The specification may include one or more formal priority-claims wherein each such priority-claim recites a specific and particular achievements performed by a claimant. For example, the priority-claims may include one or more of the following: a claim that the claimant is the first proponent of an idea; a claim that the claimant is the first proponent of a theory or a part of a theory; a claim that the claimant is the first person that performed a specific calculation; a claim that the claimant is the first person that found a method to perform a specific calculation or evaluation; a claim that claimant is the first to discover a certain phenomenon or composition of matter; a claim that the claimant is the first proponent of a certain solution to a problem etc. The above mentioned abstract ideas and the discoveries recited by the claims represent subject matter which is not eligible for patent protection under 35 United States Code § 101.

The application may include the names of the claimants and/or applicants. The application may indicate the claimants (e.g. the name of claimants) that have conceived the one or more ideas recited by a specific priority-claim. The application may indicate the claimants (e.g. the name of claimants) that have discovered the one or more discoveries recited by a priority-claim. The application may indicate the claimants (e.g. the name of claimants) that have performed the one or more achievements recited by a priority-claim. The application may specify, with respect to a priority-claim, a corresponding priority-date and one or more supporting documents showing that claimants have conceived/discovered the subject matter recited by the claim before the date and time indicated by the priority-date. The supporting documents may be documents saved by one or more claimants on a personal-priority-account on a date and time shown by their time-stamps.

FIG. 5 also shows an exemplary embodiment of the apparatus 108 for importing priority documents. The apparatus 108 for importing priority documents into the application enable applicants, users or the administrator to cause documents stored on personal-priority-accounts to be submitted as part of priority-certificate applications. The exemplary embodiment shown in FIG. 5 may be used to support the implementation of more than one apparatuses such as the personal-priority-account apparatus 102, the apparatus for receiving priority-certificates 107, the apparatus 108 for importing priority-certificates into application, and the apparatus 110 for creating priority-certificates.

The priority-data control block 602 may enable users to submit documents saved on one or more personal-priority-accounts in order for said documents to be considered as priority-documents (or provisional-applications) in a specific application for priority-certificate. The priority-data control block 602 may enable users to associate priority-documents stored on one or more personal-priority-accounts with a certain application for priority-certificates.

The priority-data control block 602 may include one or more controls 603 for importing priority data from one or more personal-priority-accounts, one or more controls configured to display the imported documents/records and their associated time-stamps 604, and one or more controls configured to display imported personal data sheet and declarations 605 of the owner of the personal-priority-account.

A user may file an application for priority-certificate by using the controls (e.g. browse button, upload buttons, and text boxes) for uploading application files 601. The application files may be stored on the memory section 526 (allocated to the specific application) of the data storage media 525. As part of the same application for a priority-certificate, the user may file the priority-documents stored on his (or a co-claimant) personal-priority-account by using the interface apparatus 602. The user may use the input device 505 and an interface-control (e g "Import Data" button on interface 602) to activate one or more controls 506 on user's computer and one or more controls 516 on administrator system 510 thereby enabling the user to view on the display 504 a list of documents on his personal-priority-account and to select one or more of said listed documents (e.g. documents, data and declarations shown by 604-605) to be submitted as part of the application for priority-certificates stored on the memory section 526. Further, the user may use the input device 505 and an interface-control to activate one or more controls 506 on user's computer and one or more controls 516 on administrator system 510 thereby causing the creation of digital copies of the selected documents stored on memory-section 518 and the storing of said digital copies on the memory-section 526 associated with the application files. Thus, the user is effectively enabled to copy documents stored on his personal-priority-account (i.e. memory section 518) onto the memory section 526 storing the filed application (as shown by the arrow connecting 518 and 526 in FIG. 5). Thereby the priority-documents are associated and stored together with the corresponding application files. Similarly, the administrator (or a representative of the administrator) may be enabled to copy documents stored on an user/applicant's personal-priority-account (i.e. memory section 518) onto the memory section 526 storing an application filed by the user/applicant. The administrator may charge a fee for the specific priority-documents which are imported into the application and/or are considered by the examiner.

The priority-documents saved by a person on a personal-priority-account may be considered as "provisional priority-certificate applications" and may play the same role to the priority-certificate applications as the role that provisional patent applications play for the patent applications (i.e. saving an earlier priority-date for specific priority-claims, which may be the upload/creation date of the documents on the account describing the ideas/discoveries/achievements claimed by the specific priority-claim). The priority-documents may include files describing ideas and discoveries (together with the time-stamps indicating when each document has been saved on the personal-priority-account), files including personal information of the user, declarations, etc.

The application for priority-certificates may be examined by one or more examiners. The one or more examiners may examine one or more priority-claims of the application to find whether the claims are true (e.g. the claimant is indeed the first to conceive the idea recited by a claim or the first to discover a discovery recited by a claim). The examiner may determine, with respect to a claim, whether the documents submitted with the application support a claimant allegation that he has conceived/discovered the subject matter recited by the claim before the priority-date associated with the claim. The examiners may use the apparatus for searching and determining prior-art 109 to determine relevant prior-art for a priority-claim according to the corresponding priority-date of the claim. The apparatus 109 for searching and determining prior-art may be a search engine. The examiner may allow the claimants to amend, cancel and add priority-claims.

FIG. 7 shows an exemplary embodiment of a computer interface apparatus associated with an application for priority-certificates 700. The interface apparatus 700 may be implemented via one or more webpages. The interface apparatus 700 may include text describing an application number, a title, and one or more names of the claimants. Further, the interface apparatus 700 may include a list 701 specifying the claimants and the priority-dates, alleged by the application, for one or more claims of the application. The interface apparatus 700 may further include a plurality of controls enabling a user to view/download (e.g. via hyperlinks) the application files 702 and the examination/prosecution history files 703. The interface apparatus 700 may include a field describing the status of the application such as: unexamined, laid-open, under examination, issued, abandoned etc. The interface 700 may further include a list of scientific fields and sub-fields (e.g. physics, solid state physics, crystalline/lattice structure) to which the subject matter of the claims/application pertain. The user may be enabled to specify with regard to his application the specific fields and sub-fields the application pertains. An examiner may be enabled to assign to the application said specific fields and sub-fields. The interface may identify the claimants by name, may specify that one or more claimants prefer to remain anonymous and identify them as such (e.g. "anonymous-claimant-1", "anonymous-claimant-2," etc.), or may provide only partial information about the claimants.

Further, the interface 700 may include an interface apparatus 705 for submitting and viewing third-party comments and documents. The apparatus 705 may be configured to enable third parties to submit comments and documents (e.g. alleged prior art) relevant to the application and/or to the validity of the priority-claims. The third-parties may be members of the public such as scientists, innovators, engineers, artists, etc. For example, a scientist (third-party—not otherwise connected with the application) may access the webpage associated with an application and, upon reading the published application, may find out that he is aware of a journal article that already discloses an idea very similar to an idea recited in a priority claim. The third-party scientist may want to submit the journal article (together with comments and explanations regarding the relevance of the article) to the examiner of the application such that the examiner may consider it as prior-art.

The interface apparatus 705 may be configured to display a list of the comments and documents submitted by third parties. The interface apparatus 705 may be configured to enable the user or a third party to access the submitted comments and documents (e.g. via hyperlinks on a webpage). The apparatus for submitting third-party comments 705 may include one or more controls, buttons and text boxes placed on the webpages associated with the application such as the ones shown in FIG. 7 and FIG. 9*b*, enabling a third-party to submit documents including prior-art and comments. The documents and comments submitted by third-parties may be published on the webpages associated with the application and priority-certificate such that the public can access/view the comments and documents submitted (e.g. by clicking the hyperlinks associated with the documents shown on interface 705 of FIG. 7.

FIG. 8 shows an exemplary embodiment of an implementation of the interface apparatus 705 and its functioning. FIG. 8 shows part of the apparatus/system 500 described with reference to FIG. 5 (the user's system has been omitted for clarity). The system in FIG. 8 further includes/depicts a plurality of computers (801-803) connected with the administrator system 510 via the network 520. A webpage 530 associated with the interface 700 (corresponding to a certain application) may be stored on the storage media 525. The computers 801 and 803 may be owned by third-parties that may want to access the webpage 530. For example, third-party 1 may send a request via network 520 to the administrator system 510 to access the webpage file 530 stored on storage media 525. In response, the administrator system 510 may send to the computer 801 the webpage file 530. The third-party-1 may open the webpage file 530 corresponding to the application and view/access on a display an interface such as the interface 700 in FIG. 7. The third-party-1 may use the controls of interface 705, controls on his computer, and the controls 516 to send document-1 (including comments or prior art) from his computer 801 to the administrator system 501. In response, the administrator system 510 may cause the document-1 to be stored on storage media 525 in association with the application. Further, the administrator system 510 may add a hyperlink corresponding to the document-1 on the interface 705 such that a third party viewing the interface 705 is enabled to download/view a copy of the document-1 (including comments and alleged prior art) submitted by third-party-1.

Upon finding, as a result of examination, that the claims in an application are true or most likely true, an examiner may issue a priority-certificate in the name of the claimants. The apparatus for creating priority-certificates 110 may be used (e.g. by the administrator) to create a priority-certificate. The priority-certificate may be created in hard-copy such as printed on paper. The priority-certificate may be created in digital form and may be published on a website.

FIG. 9*a* shows an exemplary embodiment of an issued priority-certificate 900. A priority-certificate may include a title, the names of one or more claimants, the associations of the claimants (e.g. claimants may be employed by a company such as Electronics Corp.), a priority-certificate number, an application number of the application for which the priority-certificate was granted. The priority-certificate may include a statement of the grantor attesting that grantor had the claims of the application examined and that, to the best of grantor's knowledge, the priority-claims have been found to be true and valid. The priority-certificate may include a statement that a priority-certificate has been granted on the issue date attesting that claimants are the first to discover the subject matter claimed in the associated application. The priority-certificate may include the specification of the application, the drawings and the claims. The priority-certificate may specify the claimants and the priority-date associated with a priority-claim. The priority-certificate may specify for each of the priority-claims the corresponding claimants and priority-dates. The priority-certificate may specify one or more scientific fields and sub-fields to which the priority-claims pertain.

The apparatus for creating priority-certificates 110 may be configured to create a computer interface 910 associated to a priority-certificate. FIG. 9b shows an exemplary embodiment of a computer interface 910 associated with a priority-certificate. The computer interface 910 may include one or more webpages of a website. The computer interface may include a title of the priority-certificate, the name of the claimants, the corresponding application number and an issue date. The computer interface 910 may further include a list/table 911 specifying the valid priority-claims, the claimants of each of the valid priority-claims and the corresponding priority-date associated with each valid priority-claim. Further, the computer interface 910 may include a block 912 specifying the subject matter classification of the priority-certificate, a block 913 specifying a status of the priority-certificate, a block 914 listing one or more hyperlinks to a detailed description of the ideas/discoveries/achievements disclosed or claimed in the priority-certificate (e.g. Specification, Abstract, Drawings, List of claims) and one or more hyperlinks to the documents associated with examination/prosecution history (e.g. rejections, arguments, etc.). The computer interface 910 may further include an interface 915 enabling third parties to submit comments regarding the issued priority-certificate and to request reexamination in light of submissions and prior art. Interface 915 functions the same way as the interface 705 described with respect to FIG. 7. The computer interface 910 may further include a rating and scores block 916 and a rank block 917.

The apparatus for creating priority-certificates 110 may include one or more components for accessing information and communicating with: a subject matter classification apparatus 112, an application and certificate status interface apparatus 113, an interface for accessing the detailed description of the discoveries/ideas/achievements and documents associated with examination and prosecution history 114, an interface apparatus for submitting/accessing comments and documents relevant to the validity of the claims in the application 115, a rating and scoring interface apparatus 116, and a an apparatus for ranking priority-certificates 117. Exemplary embodiments of apparatuses 112-117 are described hereinafter.

FIG. 10 shows an exemplary embodiment of other components and features of the system for awarding priority certificates 100. The components show in in FIG. 10 may include one or more webpages, one or more computers which may be disposed on one or more computer networks or on internet. The system for awarding priority-certificates 100 may include: a subject matter classification apparatus 112, an application and certificate status determination apparatus 113, an interface for publishing application documents and prosecution history 114, an apparatus for submitting/accessing comments and documents relevant to the validity of the claims in the application 115, a rating and scoring interface apparatus 116, and an apparatus for ranking priority-certificates 117. The apparatuses 112 to 117 may be configured to receive input from one or more examiners, and/or from applicants, and/or form third-parties, and/or form the public.

The subject matter classification apparatus 112 may be configured to enable an examiner and/or a user to associate one or more classes and sub-classes to the priority-certificates and/or applications received by the grantor/administrator. The grantor/administrator may implement classification by subject matter (technical and scientific fields and sub-fields) of the priority-certificates/applications. The classification may include a plurality of classes and sub-classes corresponding to specific technical and scientific fields and sub-fields, respectively. A priority-certificate/application disclosing an idea or discovery pertaining to a specific field and sub-fields may be associated to the classes and sub-classes corresponding to the specific scientific fields and subfields. For example, the priority-certificate shown in FIG. 9b (and the applications shown in FIG. 7) is associated to the field physics, first-order sub-field "solid state physics," and second-order sub-field "crystalline structure".

The subject matter classification apparatus 112 may include one or more webpages as shown in FIG. 11. The subject matter classification apparatus 112 may be configured to form a webpage 150 displaying a plurality of primary scientific fields such as: mathematics, physics, chemistry, biology, economic, social sciences, law, business methods as seen for example in FIG. 11. Each displayed primary field may include a plurality of sub-fields. For example, the physics primary field may include the first-order subfields: atomic physics, solid state physics, elementary particles, nuclear physics, and plasma physics. A list of the first-order sub-fields may be displayed on a webpage 151 (see FIG. 11) configured to be accessed via a hyperlink to the item physics on the webpage 150 webpage. Each of the first order sub-fields may include a plurality of second-order subfields. For example, the solid state physics may include: semiconductors, metals, insulators, crystalline structure etc. The second-order sub-fields may be displayed on a webpage 152 accessed by clicking, via a hyperlink, the item "solid state physics" on webpage 151 (see FIG. 11).

Further, the subject matter classification apparatus 112 may be configured to form a list of all the priority-certificates (or applications) filed in a specific field or sub-field in a certain period of time and to enable a user to view, displayed on a webpage, the list of the priority-certificates (or applications). For example, the sub-field "crystalline-structure" on webpage 152 may include/have an associated control (e.g. hyperlink, buttons, text-boxes) such that, upon clicking/pushing the control, a webpage 153 listing an index of priority-certificates (e.g. titles, authors, and issue date) issued in the crystalline-structure field is displayed as shown in FIG. 12. A similar list may be formed for the primary field "medicine", primary subfield "surgical procedures" and secondary field "eye surgery".

Moreover, the subject matter classification apparatus 112 may include an apparatus for accepting input from users 154 regarding a time period or other parameters. For example, the apparatus for accepting input from a user 154 may be a text box where the user may enter a time period and, as a result, the list of priority-certificates may include only priority-certificates issued in the time period entered by the user. Each of the displayed priority-certificates/applications on a list (e.g. such as the one shown in FIG. 12) may be associated a hyperlink/button which, upon clicking, displays the webpage of the specific priority-certificate such as the webpage associated with the priority-certificate shown in FIGS. 9a and 9b.

The subject matter classification apparatus 112 classifies and organizes the priority-certificates issued by a grantor (and/or the pending applications) function of scientific fields and sub-fields. As a result, a user (e.g. researchers, scientist, students, and other interested parties) may easily access, via a website associated with the system, the priority-certificates/applications in his or her field of endeavor over the desired time period. Such a service and website may be an important learning tool for the public. Scientists and innovators can view a list of the new ideas/discoveries/achievements made in their specific field of interest thereby learning about the state of the art in such fields.

The apparatus 112 may further be configured to enable an administrator and/or a claimant to associate one or more classes and sub-classes to a published priority-claim such as the one described with respect to FIG. 4b. The published priority-claims may be classified in the same way as explained above regarding the priority-certificates and the applications. A claimant may be enabled to enter/specify the specific classes and sub-classes to which his published priority-claim pertains. Lists including "published priority-claims" (as in FIG. 4b) may be formed and published on an interface/webpage 153 such as the one shown in FIG. 12. A user (e.g. a scientist interested to see what new priority-claims have been asserted in his field) may be enabled to choose, via interface 153, whether he wants to display a list of priority-certificates, a list of applications, or a list of "published priority-claims".

The application and certificate status interface apparatus 113 may be configured to enable the grantor (or a representative of the grantor) to input a status of the application and/or priority-certificates. The status of the application may be, for example, one or more of: un-examined, published, laid-open, under examination, issued etc. The status of the priority-certificate may be, for example, one or more of: valid, under challenge, under re-examination, invalidated, etc. The interface 113 may be implemented via one or more of: computers, non-transitory computer readable media, software stored on the computers and webpages.

The status of an application/priority-certificate may be published on a webpage associated with the application/priority-certificate as shown by FIGS. 7, 9a, and 9b.

The interface for publishing application documents and prosecution history 114 may be configured to enable the grantor (or a representative of the grantor) to form one or more lists including one or more documents relevant to an application. Such a list may include one or more of: an abstract of the application, a specification of the application describing in detail the ideas/discoveries/achievements, drawings, a list of priority-claims, declarations of the claimants, priority-documents, and documents relating to examination and prosecution history. The documents relating to examination and prosecution-history may include one or more of: comments by the examiners, rejections and reasons for rejections, the reply/answer of the claimants to examiners' comments and rejections etc.

Such documents relevant to the application may be published on a webpage associated with the application/priority-certificates as shown in FIGS. 7 and 9b.

The rating and scoring interface apparatus 116 may be configured to enable the grantor (or a representative of the grantor) to rate and/or assign one or more scores to a priority-certificate. The grantor may assign to the priority-certificates a score according to parameters such as: predicted value to society, creativity, long-term impact, ground-breaking etc. The grantor may appoint one or more experts in a specific field to assign scores to priority-certificates in that field. For example, experts in materials science may examine a priority-certificate pertaining to molecular beam epitaxy and assign the following scores: 5 (out of 10) for value to society; 9 for creativity, 4 for theoretical importance, 8 for ground-breaking.

The rating and scoring interface 116 may be implemented via one or more of: computers, non-transitory computer readable media, software stored on the computers and webpages. The rating and scoring interface 116 may include one or more buttons, controls, and text boxes. A representative of the grantor may access the interface 116 via a computer and input the one or more scores associated with a priority-certificate via the controls, buttons and text boxes of the interface 116. The scores entered by the representative of the grantor are thereby stored on one or more non-transitory computer storage media (e.g. a hard-drive) as associated with the priority-certificate. The scores associated with a priority-certificate may be published on the webpage of the specific priority-certificate as shown by block 916 in FIG. 9b.

An apparatus for ranking priority-certificates 117 may be configured to enable a representative of the grantor to form one or more lists. The grantor may appoint one or more experts in a specific field to rank the priority-certificates issued in that field over a certain period of time (e.g. the last two years) according to their predicted value to society or other parameters. The priority-certificate predicted to have the highest value to the society is ranked number one on the list, the second most valuable is ranked number two and so on. For example, assume that in the field of materials-science have been issued 240 priority-certificates in year 2015. The materials science experts may rank the 240 certificates (or a sub-set) according to their "predicted value to society". A list of the ranked priority-certificates granted in 2015 for the materials-science field may be displayed on a webpage according to their rank—the more valuable the discovery claimed in the priority-certificate the higher the rank.

The apparatus for ranking priority-certificates 117 may be implemented via one or more of: computers, non-transitory computer readable storage media, software stored on the computers and webpages. The apparatus for ranking priority-certificates 117 may include one or more buttons, controls, and text boxes. A representative of the grantor may access the apparatus 117 via a computer interface and use the controls, buttons and text boxes of the apparatus 117 to form a ranked list of the priority-certificates issued in a certain field over a certain period of time. The lists formed by the representative of the grantor are thereby stored on one or more non-transitory computer storage media (e.g. a hard-drive).

The grantor may publish one or more of the lists ranking the priority-certificates, issued in a certain subfield over a certain period, according to their predicted value to society, to creativity or other parameters. FIG. 13 shows an exemplary embodiment of a ranked list of priority-certificates, issued in the Materials-Science field in the year 2015, published on a webpage associated with the list.

BRIEF DESCRIPTION OF THE DRAWINGS

FIG. 4b is a view showing a computer interface associated with a published priority-claim according to an exemplary embodiment of the present invention.

FIG. 7 is a view showing a computer interface apparatus associated with an application for priority-certificates according to an exemplary embodiment of the present invention.

FIG. 9a is a view showing an exemplary embodiment of an issued priority-certificate.

FIG. 9b is a view showing an exemplary embodiment of a computer interface associated with a priority-certificate.

FIG. 10 is a view showing components and features of the system for awarding priority certificates according to an exemplary embodiment of the present invention.

FIG. 12 is a view showing a second interface associated with a subject matter classification apparatus according to an exemplary embodiment of the present invention.

FIG. 13 is a view showing an interface displaying a ranked list of priority-certificates according to an exemplary embodiment of the present invention.

BEST MODE FOR CARRYING OUT THE INVENTION

Figure 1:
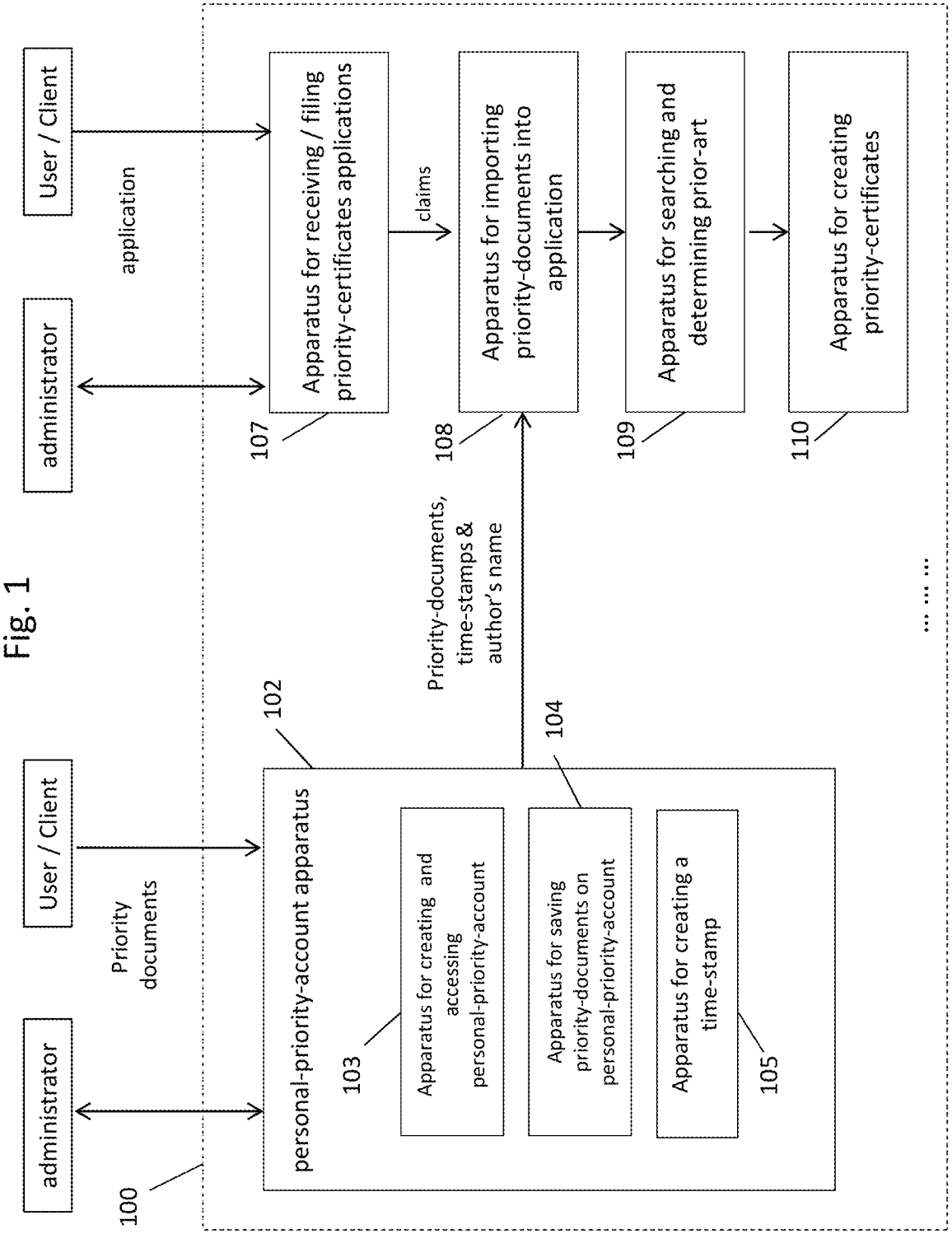
FIG. 1 is a view showing a system for awarding priority-certificates according to an exemplary embodiment of the present invention.
Figure 2:
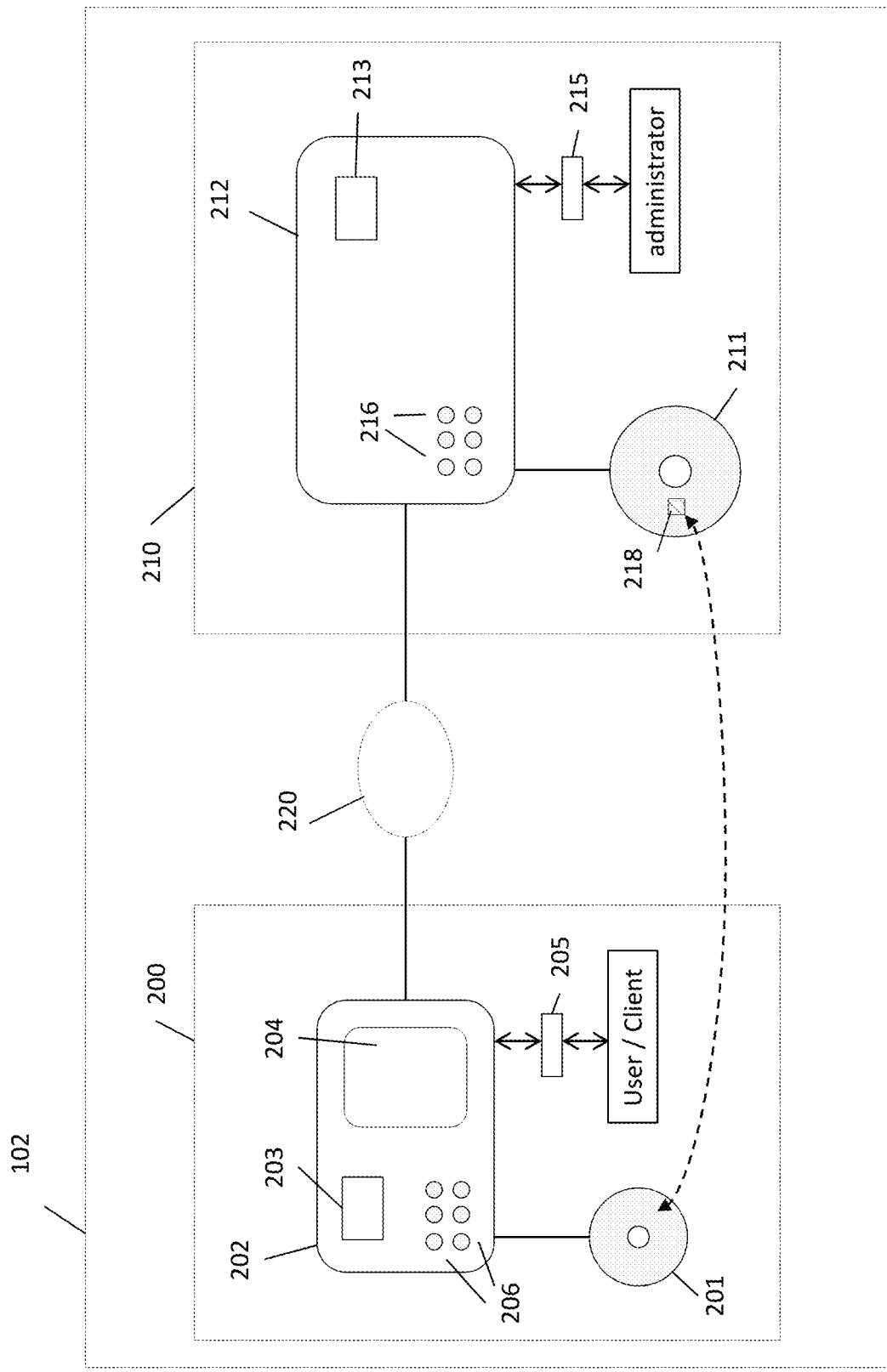
FIG. 2 is a view showing an apparatus for creating and accessing a personal-priority-account according to an exemplary embodiment of the present invention.
Figure 3:
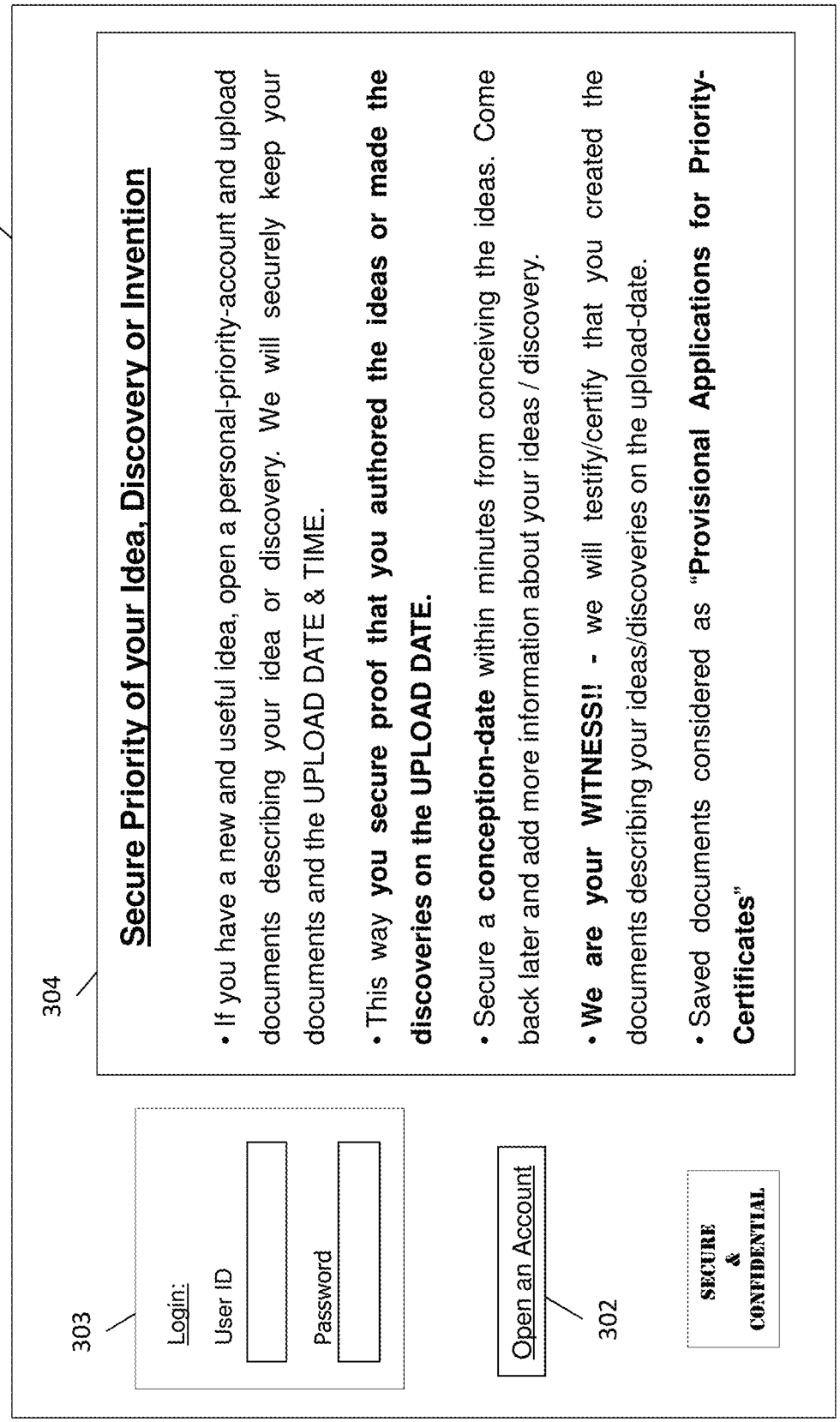
FIG. 3 is a view showing a computer interface associated with a personal-priority-account according to an exemplary embodiment of the present invention.
Figure 4:
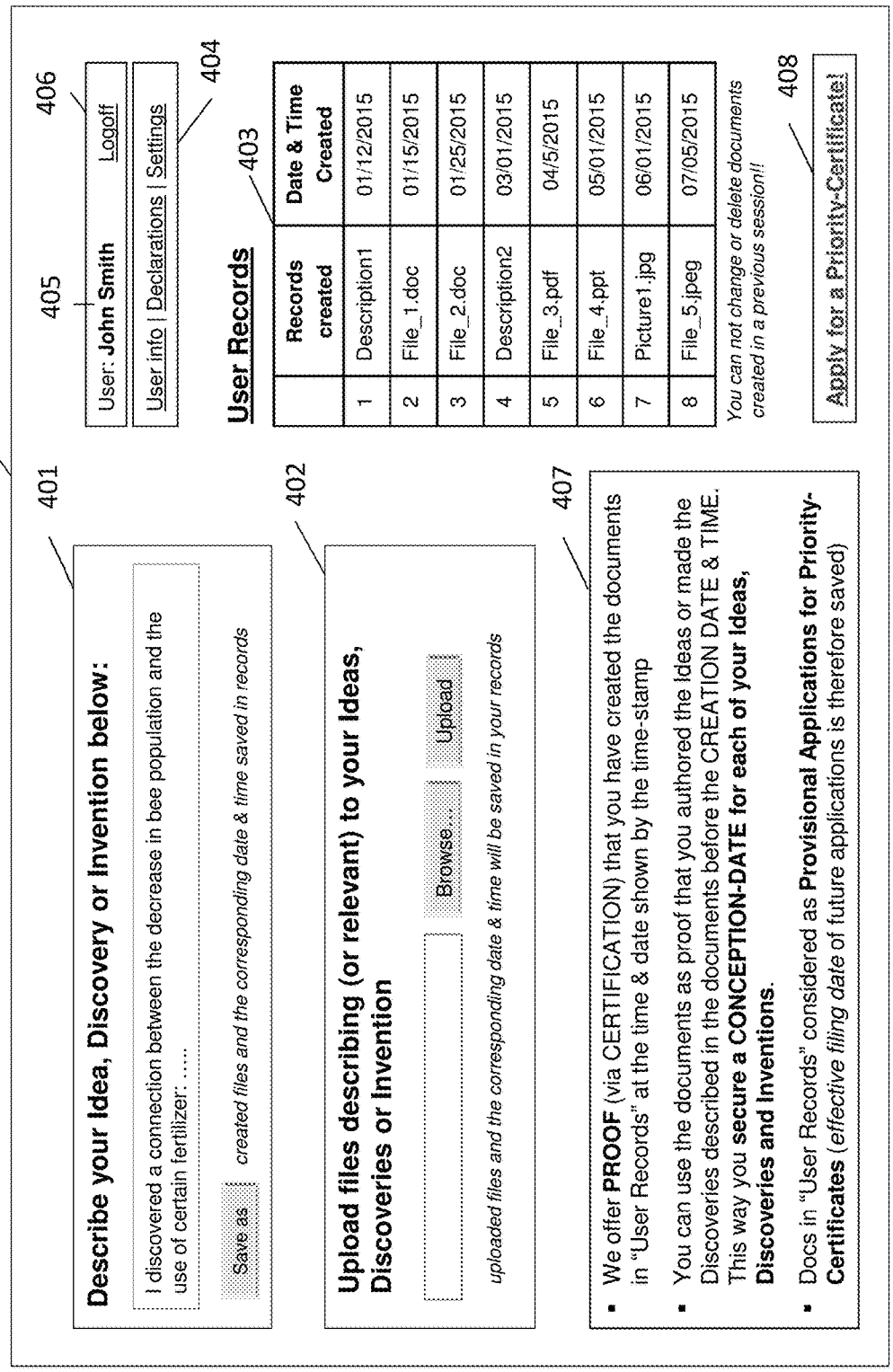
FIG. 4 is a view showing another computer interface associated with a personal-priority-account according to another exemplary embodiment of the present invention.
Figure 5:
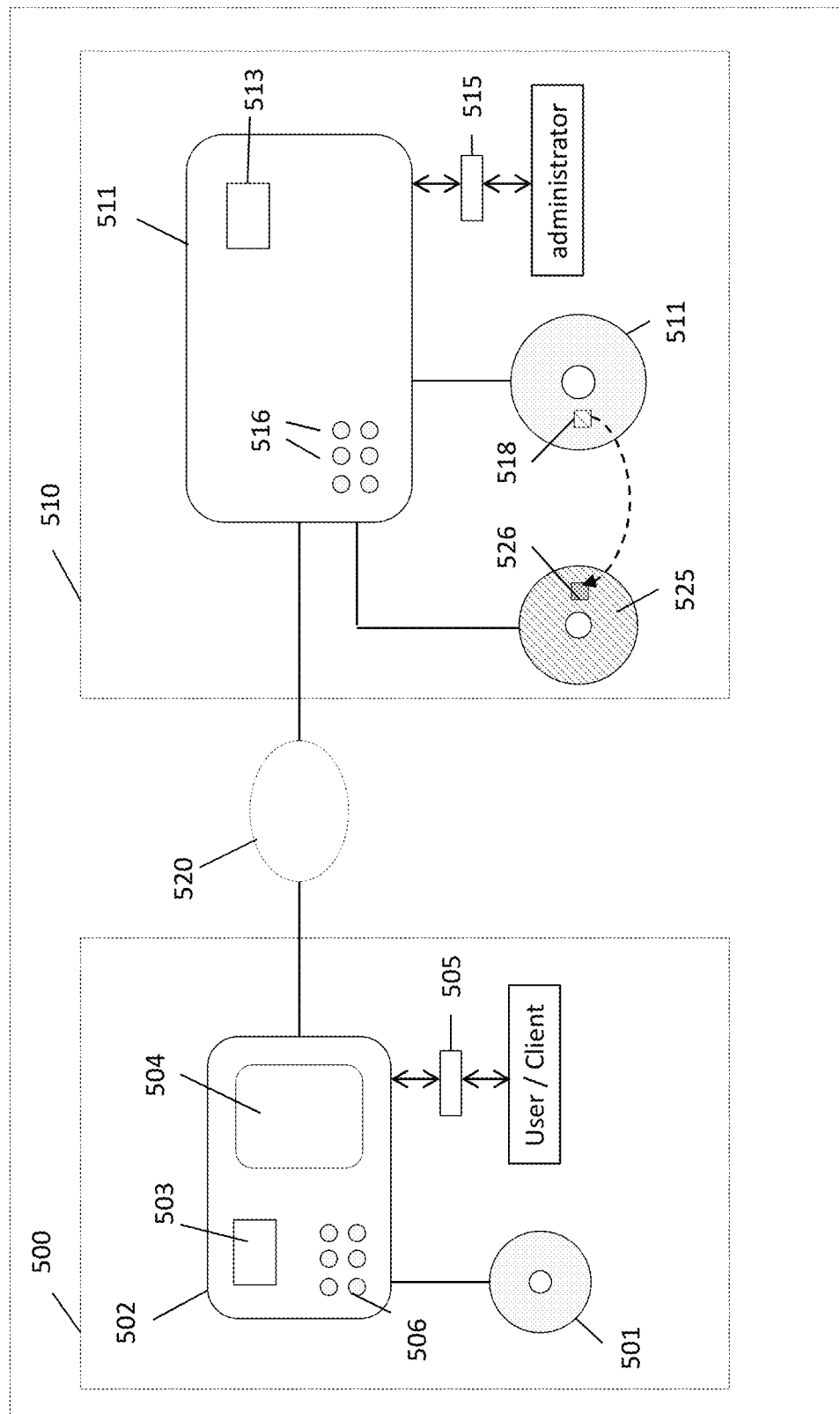
FIG. 5 is a view showing a priority-certificate application receiving apparatus and an apparatus for creating and accessing a personal-priority-account according to an exemplary embodiment of the present invention.
Figure 6:
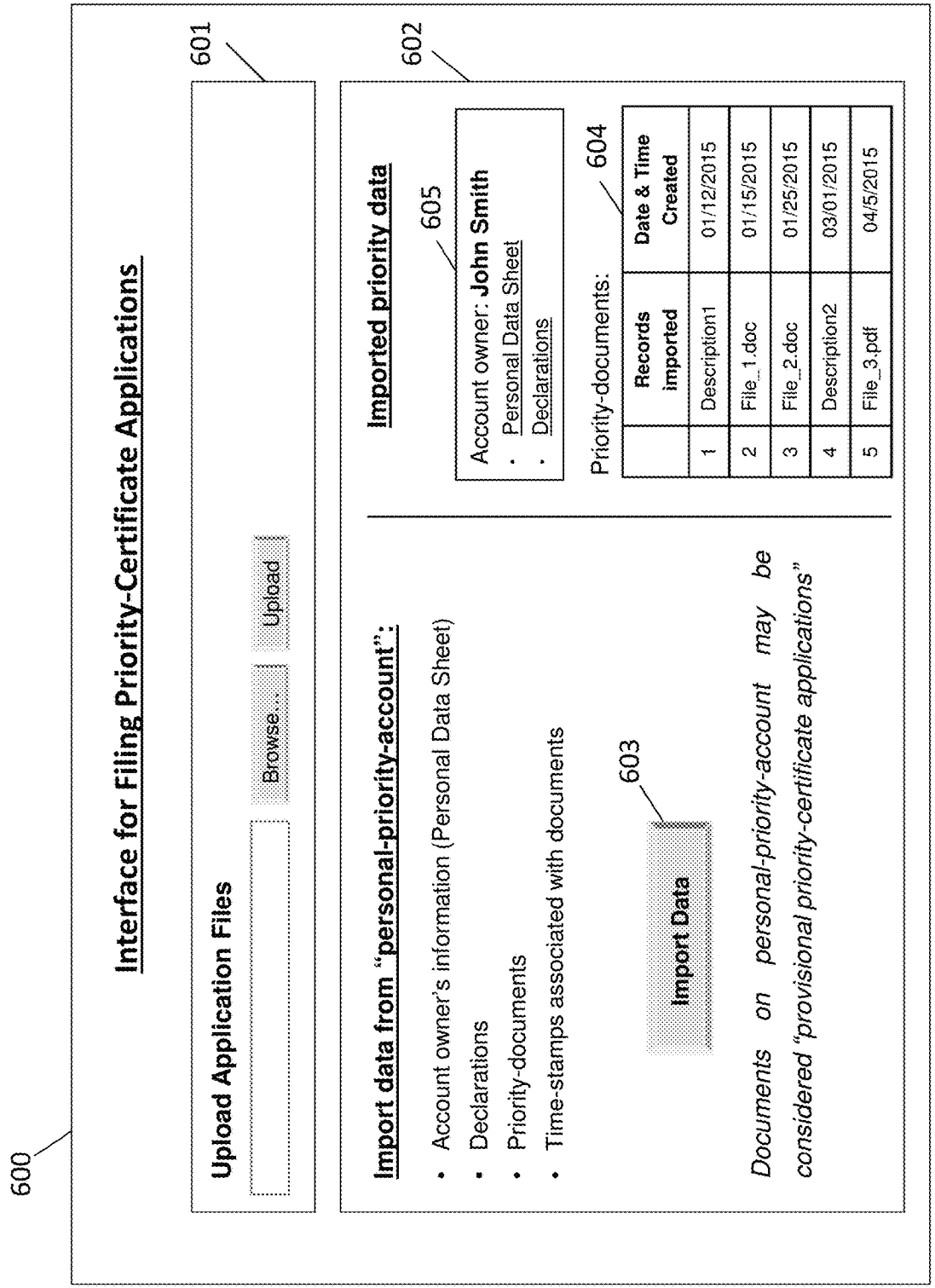
FIG. 6 is a view showing a computer interface for filing applications for priority-certificate according to an exemplary embodiment of the present invention.
Figure 8:
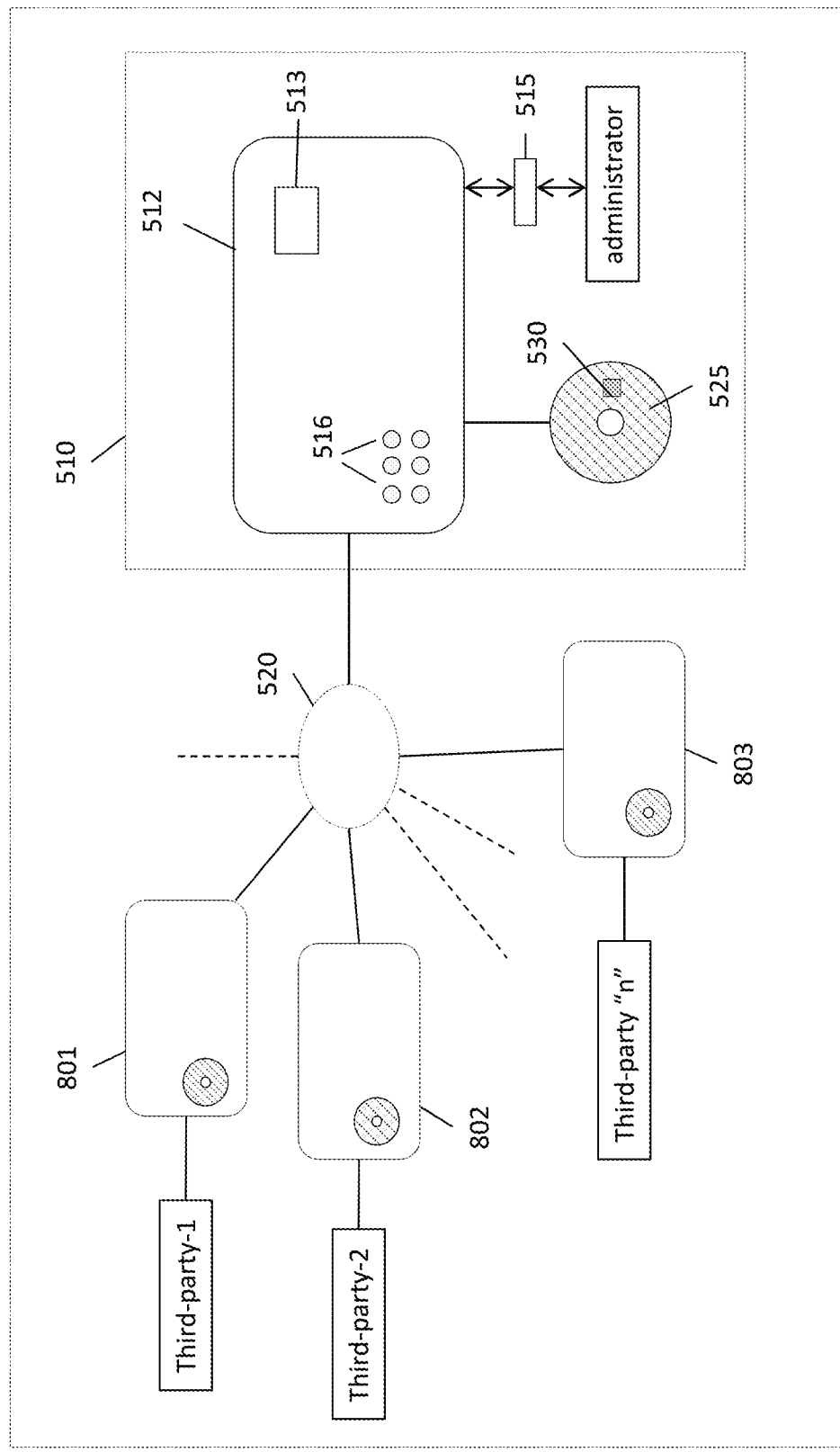
FIG. 8 is a view showing a system for awarding priority-certificates according to another exemplary embodiment of the present invention.
Figure 11:
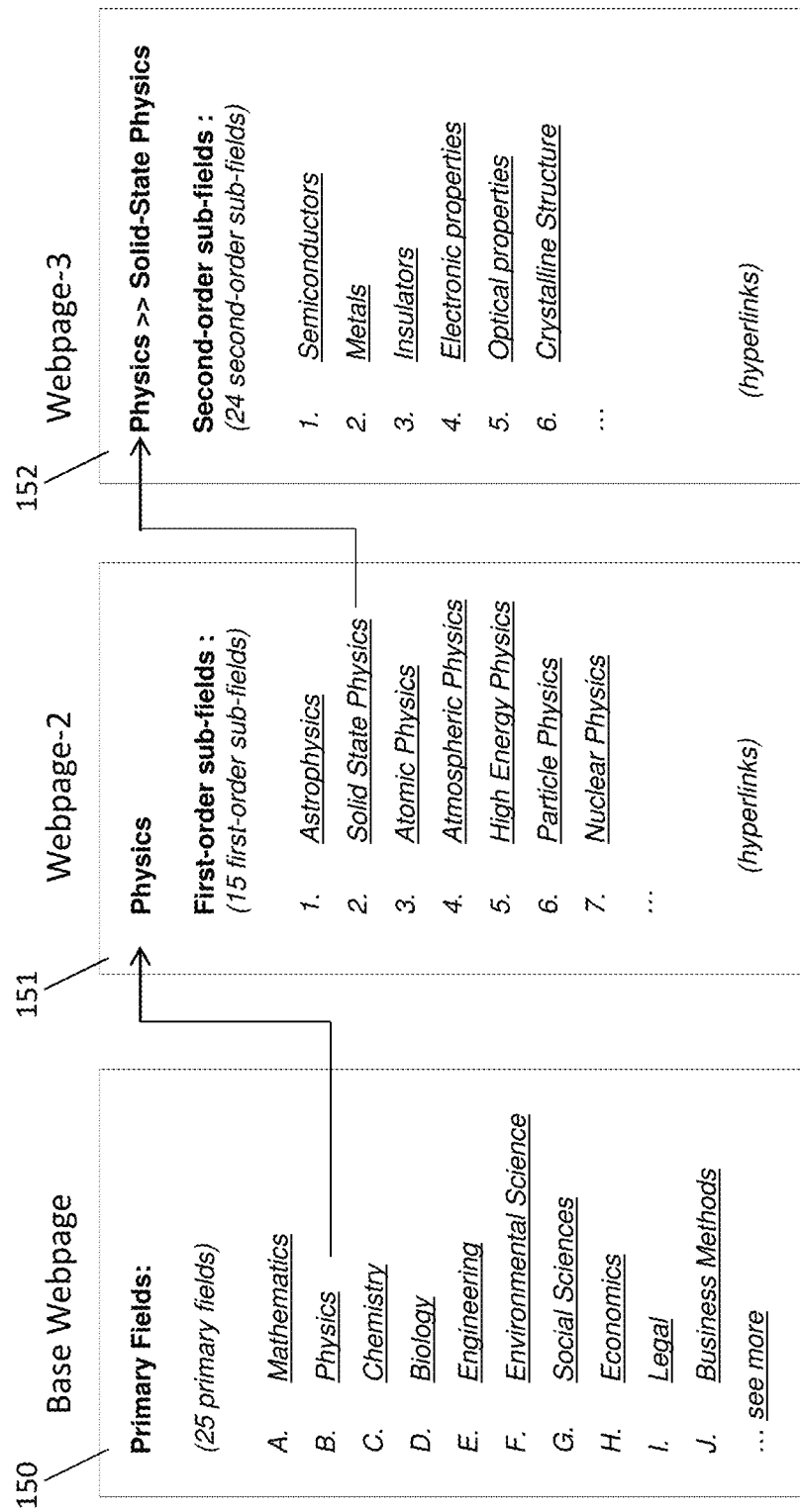
FIG. 11 is a view showing an interface associated with a subject matter classification apparatus according to an exemplary embodiment of the present invention.

The systems shown in the exemplary embodiments of FIGS. 5 and 8 may be used to support the implementation of the apparatuses 100-117 described herein.

A private party (or a government entity) may implement and administrate a priority-certificates system as the one described above and establish itself as grantor of priority-certificates. The private party may advertise and/or publish (e.g. in newspapers, on a website) an offer to grant priority-certificates to members of the public. The private party may legally bind itself, by a contractual offer, to grant priority-certificates to any applicant that satisfies the conditions and requirements set forth by the terms of the contractual offer. For example, the private party may publish in a newspaper a contractual offer stating that: the offeror promises to grant a priority-certificate to whoever makes any new and useful discovery or conceives any new and useful idea, thesis or theory subject to the terms and conditions hereinafter. The terms and conditions for granting priority-certificates may be set by contractual stipulations.

The grantor receives, processes and examines priority-certificates applications from applicants. Upon finding that a priority claim in an application is true, the private party may grant a priority-certificate to the claimant, stating that grantor has examined the application and has found that claimant is the first to conceive the claimed idea or the first to discover the claimed discovery. The priority-certificate may take the form of a diploma issued by the private party and bearing the name and seal of the grantor.

In an exemplary embodiment the administrator of a system for awarding priority-certificates 100 (and of the apparatuses/systems 101-117) may consider and/or may be bound to consider the priority-certificate applications of substantially any person applying for such certificates of priority (similar to the way the USPTO is bound to consider the applications for patent of substantially everybody). The system 100 may be substantially open to everybody in the world in the same way the US Patent Office accepts, considers, and examines applications of substantially any person in the world and grants patents to essentially any person. The service may be open to the public. In another exemplary embodiment, the administrator of the system 100 may limit the applicants to members (or parties connected to) of one or more specific organizations or to members of one or more specific trades.

INDUSTRIAL APPLICABILITY

The systems and apparatuses disclosed in this application provides parties (e.g. scientists, engineers, creators, problem solvers, innovators, thinkers etc.) with a computer based means helping such parties to: secure priority for their ideas and discoveries; assert/publish priority-claims; prove that they have achieved a certain feat/achievement; and secure credit and recognition for their discoveries and ideas. For example, the methods and systems disclosed herein may help a person to show and prove that he or she is: the first to discover a phenomenon; the first to discover a naturally occurring composition of matter; or the first proponent of an abstract idea or thesis.

While the exemplary embodiments have been shown and described, it will be understood by those skilled in the art that various changes in form and details may be made thereto without departing from the spirit and scope of the present disclosure as defined by the appended claims.

In addition, many modifications can be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A system for awarding priority-certificates, the system comprising:
   (a) a first-computer-system comprising one or more processors, one or more memories, and one or more controls;
   (b) a personal-priority-account apparatus, comprising:
      a first-storage-unit connected with the first-computer-system, the first-storage-unit comprising a first-memory-section allocated to a personal-priority-account, the first-memory-section storing one or more priority-documents;
      an apparatus-1 for creating and accessing a personal-priority-account, the apparatus-1 comprising one or more first-controls and being configured to:
      receive a request from a user-computer, via an internet connection or a network, for opening a personal-priority-account associated with a user and allocate the first-memory-section to the user's personal-priority-account; and
      an apparatus-2 for storing priority-documents on the personal-priority-account and for accessing the personal-priority-account, apparatus-2 comprising one or more of the controls and being configured to:

receive at the first-computer-system, from the user, one or more priority-documents stored on a user-storage-media and store said priority-documents on the first-memory-section;

(c) an apparatus-3 for receiving a priority-certificate application, the apparatus-3 comprising:
a second-computer-storage-unit connected with the first-computer-system, the second-storage-unit comprising a second-memory-section storing one or more priority-certificate application files, the application comprising priority-claims comprising: a claim that a claimant is the first proponent of an idea; or a claim that the claimant is the first proponent of a theory or a part of a theory; or a claim that the claimant is the first person that found a method to perform a specific calculation; or a claim that claimant is the first to discover a certain phenomenon; wherein the ideas and discoveries recited by the claims represent non-patentable subject matter;
wherein the priority-claims satisfy formal requirements as the formal claims concluding invention patents;
one or more second-controls, said second-controls being configured to receive from an applicant the priority-certificate application files and store said files on the second-storage-unit;

(d) an apparatus-4 for importing priority-documents into the application, apparatus-4 comprising one or more third-controls enabling an user or an administrator to copy, by using a computer interface, one or more of the priority-documents onto the second-memory-section;
wherein the priority-documents are considered provisional application for priority-certificates;

(e) an apparatus-5 for examining the priority-certificate applications comprising the formal priority-claims and for creating and issuing priority-certificates, wherein the examination of a priority-certificate application comprises: examination of the formal priority-claims comprised by the application to determine whether the claimant is the first to conceive an idea recited by the priority-claim or the first to discover a discovery recited by the claim; and
wherein, upon finding as a result of examination that the claims in the application are true, the apparatus-5 is configured to create and issue a priority-certificate for the formal priority-claims; the priority-claims comprising: a claim that the claimant is the first proponent of an idea; or a claim that the claimant is the first proponent of a theory or a part of a theory; or a claim that the claimant is the first person that found a method to perform a specific calculation; or a claim that claimant is the first to discover a certain phenomenon; and wherein the ideas and discoveries recited by the claims represent non-patentable subject matter;
wherein the priority-certificate includes a statement of the grantor attesting that the grantor has examined the application and has found that claimant is the first to conceive a claimed idea or the first to discover a claimed discovery, the priority-certificate takes the form of a diploma issued by a private party and bearing the name and seal of the grantor, and the priority-certificate is published on a website;
wherein the personal-priority-account apparatus further comprises an apparatus-7 for creating a time-stamp, said apparatus-7 comprising one or more of the controls and being configured to create a time-stamp indicating the creation or upload date and time of a document saved on the personal-priority-account and save the time-stamp on the first-memory-section as associated with the corresponding document; and,
wherein the apparatus-5 for importing priority-documents is configured to: associate priority-documents on the personal-priority-account to the application; create digital copies of said priority-documents stored on the first-memory-section and store said digital copies on the second-memory-section; enable the examiner to access said priority-documents as associated with the application; and determine a priority-date for each priority-claim of the application according to a time-stamps corresponding to the priority-documents.

2. The system for awarding priority-certificates of claim 1, further comprising an apparatus-6 for searching and determining prior art.

3. The system for awarding priority-certificates of claim 1, wherein the apparatus-3 for storing priority-documents is configured to enable a user to access the personal-priority-account and view, via login and password, the priority-documents and corresponding time-stamps stored on the personal-priority-account.

4. The system for awarding priority-certificates of claim 1, wherein the apparatus-1 is further configured to enable the user to access the second memory-section via login and password.

5. The system for awarding priority-certificates of claim 1, wherein the system is open to the public.

6. The system for awarding priority-certificates of claim 1, wherein the documents on the personal-priority-account are kept securely and confidentially, by an administrator of the personal-priority-account apparatus, on behalf of the user.

7. The system for awarding priority-certificates of claim 1, wherein the first-storage-section comprises a document including personal information of the user or identification of the user.

8. The system for awarding priority-certificates of claim 1, further comprising:
an apparatus configured to publish, via a website, the priority-certificate application and information related to the application such that members of the public can view the priority-certificate application.

9. The system for awarding priority-certificates of claim 8, further comprising:
an apparatus configured to enable third-parties to submit, via the website, comments and documents relevant to the validity of one or more priority-claims of the application and for publishing said comments and documents as associated with the application such as the public can view the comments and documents.

* * * * *